United States Patent
Hwang

(10) Patent No.: US 7,712,372 B2
(45) Date of Patent: May 11, 2010

(54) APPARATUS FOR TESTING PERFORMANCE OF CAR AUDIO SYSTEM

(75) Inventor: Eon Du Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 307 days.

(21) Appl. No.: 11/965,541

(22) Filed: Dec. 27, 2007

(65) Prior Publication Data

US 2009/0251147 A1    Oct. 8, 2009

(30) Foreign Application Priority Data

Jun. 27, 2007    (KR)    ............ 10-2007-0063749

(51) Int. Cl.
*G01B 7/16*    (2006.01)
(52) U.S. Cl. ............................ 73/777; 73/760
(58) Field of Classification Search .......... 73/760–777, 73/865.3, 865.8, 865.9
See application file for complete search history.

(56) References Cited

U.S. PATENT DOCUMENTS

| | | | | |
|---|---|---|---|---|
| 5,117,189 A | * | 5/1992 | Terminiello et al. | ......... 324/415 |
| 5,596,269 A | * | 1/1997 | Miller et al. | ............... 324/73.1 |
| 5,933,019 A | * | 8/1999 | Depue | ......................... 324/761 |
| 6,900,641 B2 | * | 5/2005 | Draggie et al. | .............. 324/418 |
| 6,949,935 B1 | * | 9/2005 | Stenger et al. | .............. 324/548 |

FOREIGN PATENT DOCUMENTS

| | | |
|---|---|---|
| JP | 1998-227630 | 8/1998 |
| JP | 2004-093248 | 3/2004 |

* cited by examiner

*Primary Examiner*—Max Noori
(74) *Attorney, Agent, or Firm*—Morgan, Lewis & Bockius LLP

(57) ABSTRACT

An apparatus for testing switches of a vehicle audio system includes contact bars. In use, a front end of each contact bar contacts either one of the switches, or a portion of the surface of the audio system. A front end of an extension bar is connected to a rear end of each contact bar. A gear unit is connected to a rear end of each extension bar, to move the extension bar forward and rearward. A motor is mounted to each gear unit, to rotate the extension bars. A piezoelectric sensor is mounted to each motor, to measure the pressure applied to the contact bars. A control unit compares the pressures measured by the piezoelectric sensors with set values, and diagnoses the switches.

5 Claims, 6 Drawing Sheets

APPARATUS FOR TESTING PERFORMANCE OF CAR AUDIO SYSTEM

CROSS-REFERENCE TO RELATED APPLICATIONS

This application claims priority to Korean Application No. 10-2007-0063749, filed on Jun. 27, 2007, the disclosure of which is incorporated herein by reference.

BACKGROUND OF THE INVENTION

1. Field of the Invention

The present invention relates generally to an apparatus for testing the performance of a car audio system.

2. Description of the Related Art

In order to prevent car audio system switches from erroneously operating, the operational feeling and operating states of the switches must be tested during manufacture. Conventionally, each individual switch is tested manually, which is inaccurate and time-consuming. In addition, a careless worker may neglect to test every switch.

SUMMARY OF THE INVENTION

An apparatus for testing switches of a vehicle audio system includes contact bars. In use, a front end of each contact bar contacts either one of the switches, or a portion of the surface of the audio system. A front end of an extension bar is connected to a rear end of each contact bar. A gear unit is connected to a rear end of each extension bar, to move the extension bar forward and rearward. A motor is mounted to each gear unit, to rotate the extension bars. A piezoelectric sensor is mounted to each motor, to measure the pressure applied to the contact bars. A control unit compares the pressures measured by the piezoelectric sensors with set values, and diagnoses the switches.

The contact bars may have hexagonal cross-sections, and may be spaced apart from each other at constant distances.

A spring may be mounted between each of the motors and its corresponding piezoelectric sensor.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and are not limitative of the present invention, and wherein.

Figure 1:
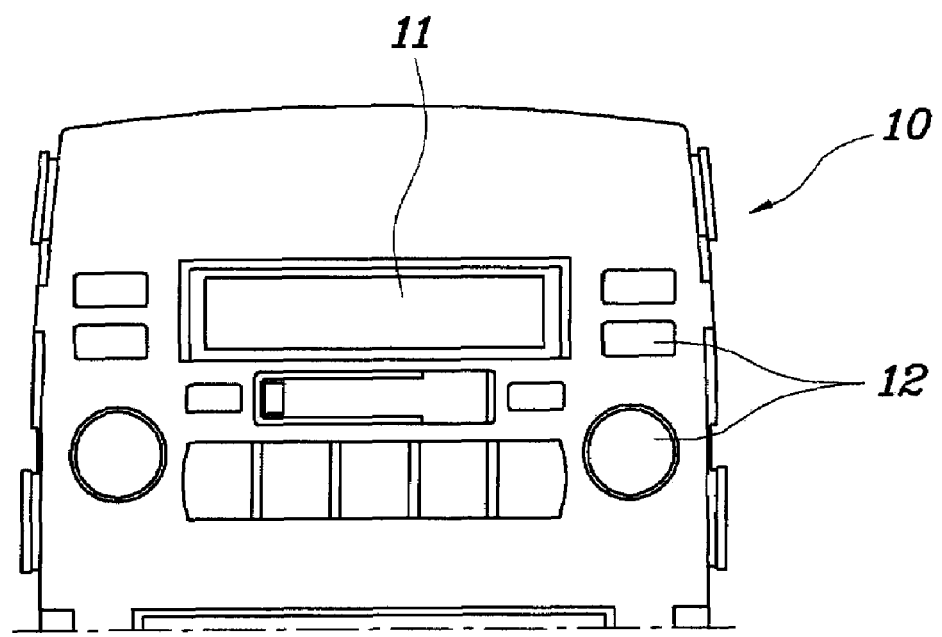
FIG. 1 is a front view showing a car audio system.
Figure 2:
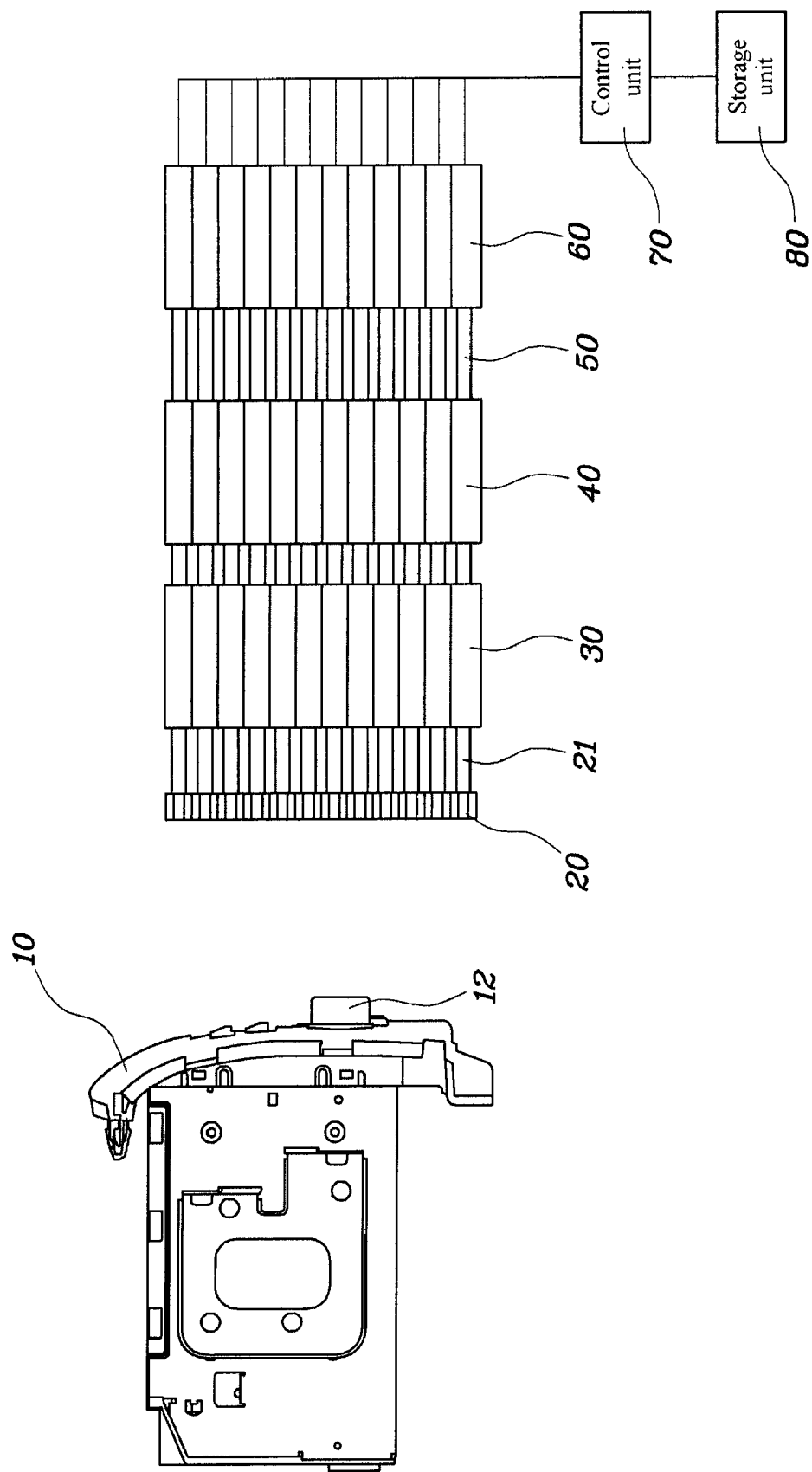
FIG. 2 is a block diagram showing an apparatus for testing the performance of a car audio system according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

The apparatus for testing the performance of a car audio system includes contact bars 20 which selectively come into contact with surfaces of switches 12, mounted to the front surface of an audio system 10, and operate the switches 12. In some embodiments, the contact bars 20 have polygonal cross-sections, and more particularly hexagonal sections, so as to be able to smoothly rotate the switches 12.

Figure 3:
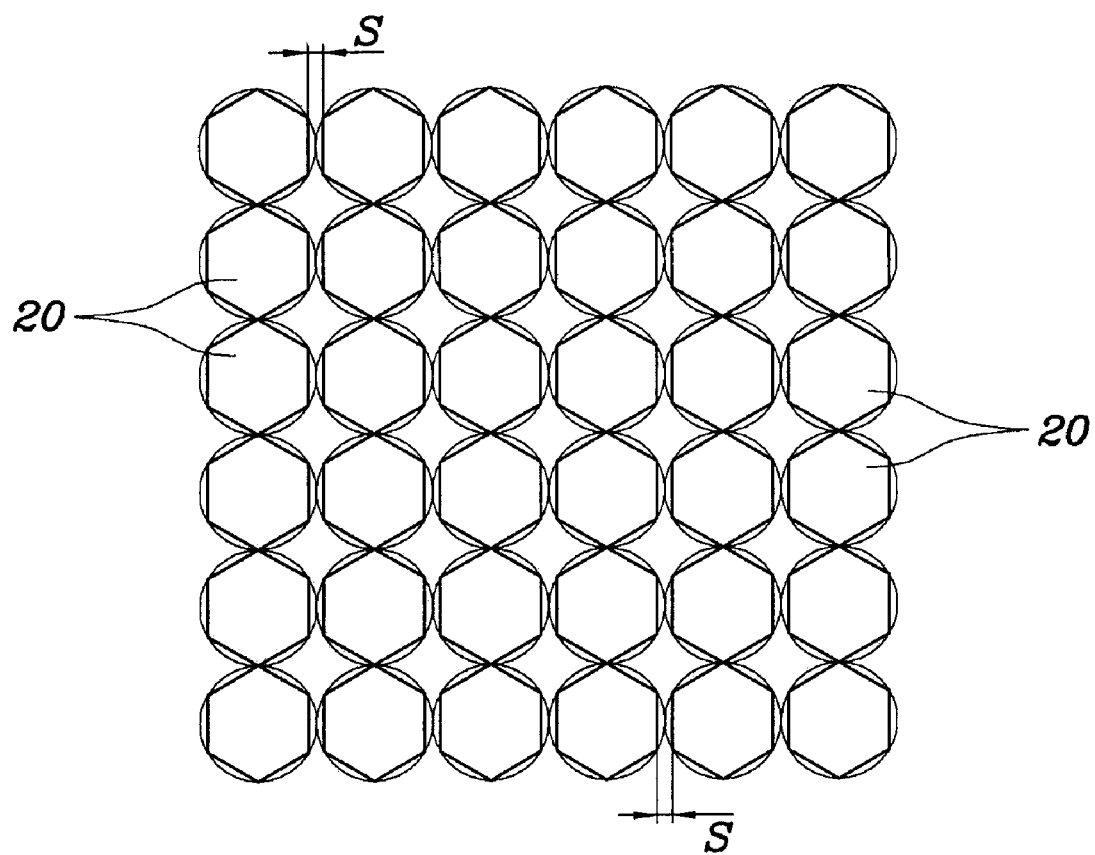
FIG. 3 is a front view of a contact part of the apparatus of FIG. 2.

The contact bars 20, as shown in FIG. 3, are space apart from each other at a distance S so as to be able to rotate independently of neighboring contact bars.

Figure 6:
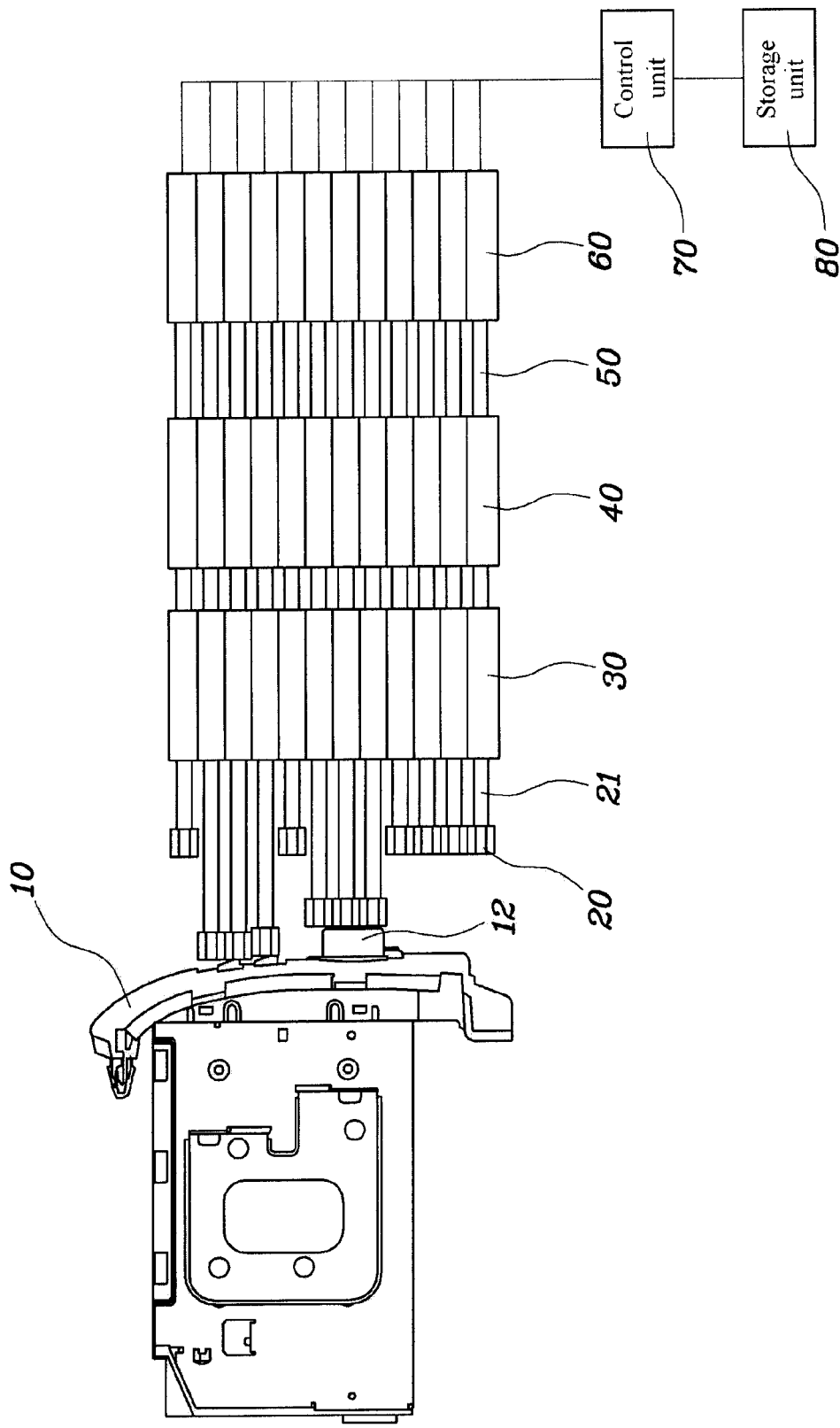
FIG. 6 is a side view showing operation of the apparatus of FIG. 2.

Furthermore, the plurality of contact bars 20, as shown in FIG. 6, is arranged over the area that corresponds to the front surface of the audio system 10, and enables the test of the switches 12, which have various sizes and are disposed at various locations. Accordingly, various makes and models of car audio systems can be tested using a single apparatus.

Extension bars 21 are mounted to the rear surfaces of the contact bars 20, and transmit rectilinear and rotational motion to the contact bars 20.

Figure 4:
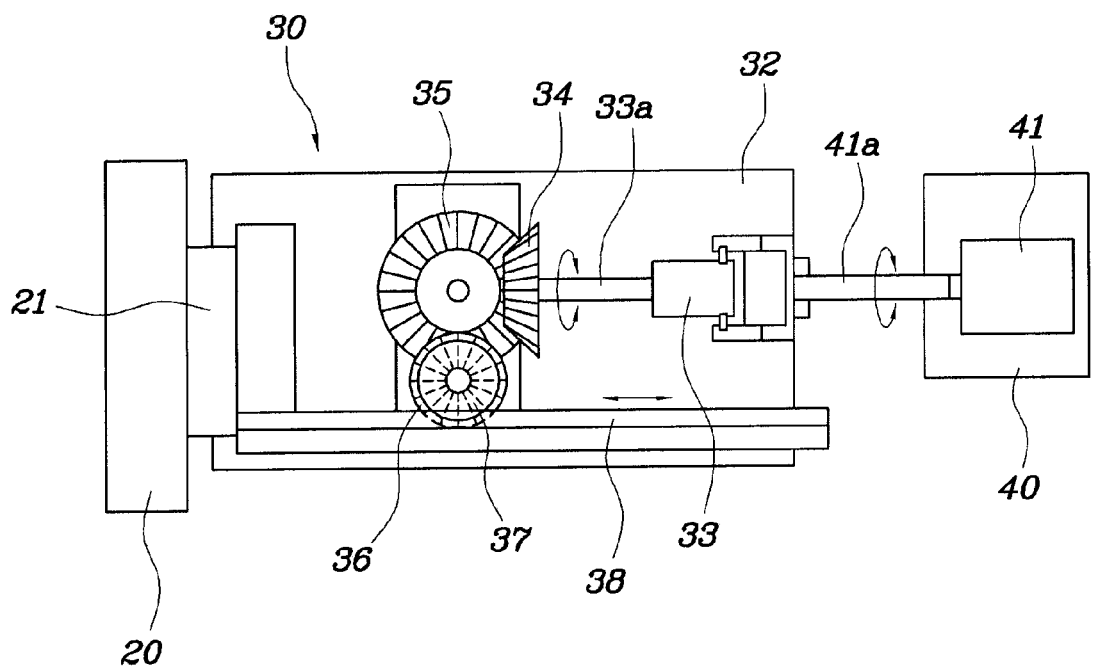
FIGS. 4 and 5 are a side view and a detailed gear diagram showing the structure of a gear unit of the apparatus of FIG. 2.
Figure 5:
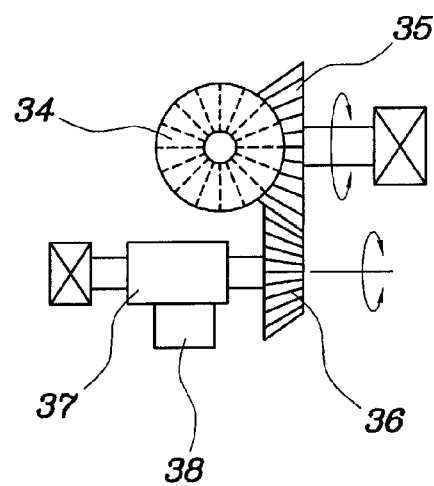

Gear units 30 for moving the extension bars 21 forward and backward are connected to the distal ends of the extension bars 21. The operation of the gear units 30 causes the contact bars 20 to move forward and backward by the extension bars 21. An exemplary gear unit 30 is shown in FIGS. 4 and 5.

Each of the gear units 30 includes a linear motion motor 33 in a hollow easing 32, and a driving bevel gear 34 mounted to the shaft 33a of the motor 33. The driving bevel gear 34 transmits power to a driven bevel gear 36 via an intermediate bevel gear 35. The driven bevel gear 36 is fixedly connected to a pinion gear 37, which is engaged with the rack gear 38. One of the extension bars 21 is connected to the front end of the rack gear 38.

Accordingly, the reversible rotation of the motor 33 causes the driving bevel gear 34 to rotate, and causes the pinion gear 37 to be rotated by the intermediate bevel gear 35 and the driven bevel gear 36. The rotation of the pinion gear 37 causes the rack gear 38, to move forward and backward. Accordingly, the extension bar 21 and the contact bar 20 move forward and backward with respect to the casing 32.

A motor unit 40 for rotating the extension bar 21 is connected to the rear end of the gear unit 30. The motor unit 40 includes a rotational motor 41, whose shaft 41a is connected to the rear end of the easing 32 of the gear unit 30. The operation of the motor 41 rotates the entire gear unit 30.

Furthermore, a piezoelectric sensor 60 is connected to the rear end of each motor unit 40. A spring 50 is mounted between each motor unit 40 and piezoelectric sensor 60. A control unit 70 compares the pressure measured by the piezoelectric sensors 60 with set values, stored in a storage unit 80. The control unit 70 further diagnoses the performance and operational feeling of the switches 12.

Operation of the apparatus is as follows: the contact bars 20 are placed in front of the audio system 10, and the gear units 30 are operated such that the extension bars 21 and contact bars 20 move forward, into contact with the surface of the audio system 10.

Figure 7:
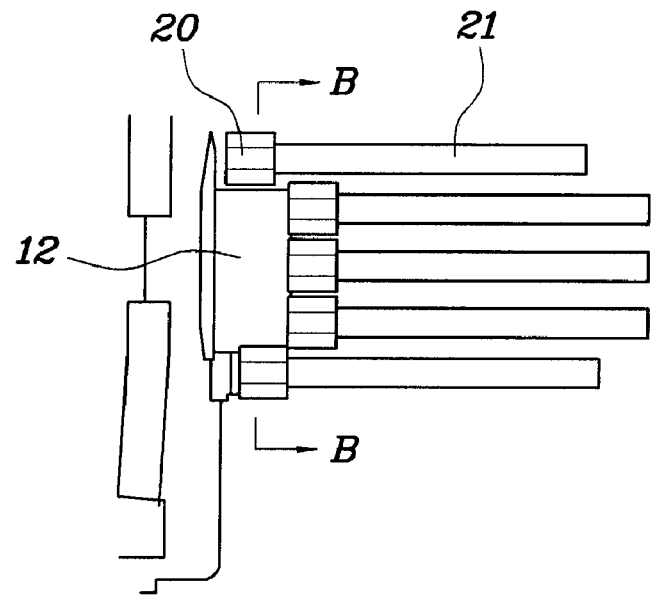
FIG. 7 is a detailed view showing operation of the apparatus of FIG. 2.
Figure 8:
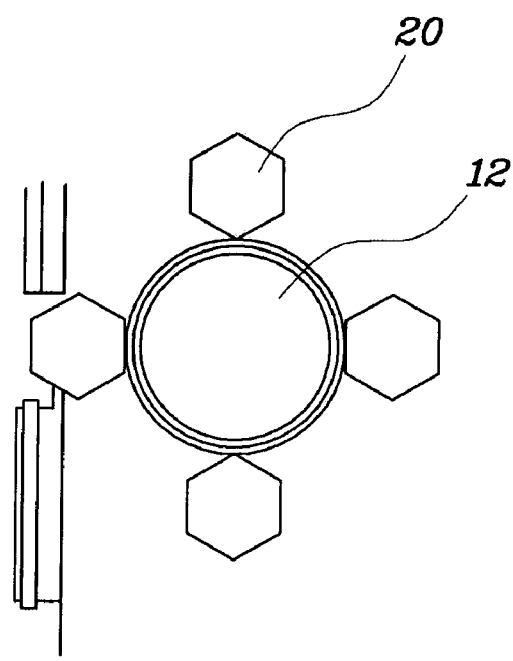
FIG. 8 is a sectional view taken along line B-B of FIG. 7.

Accordingly, as shown in FIGS. 6 and 7, some portions of the contact bars 20 come into contact with the front surfaces of the switches 12, and some come into contact with the surface of the audio system 10. Some contact bars 20, as shown in FIG. 8, contact the side surfaces of the switches 12.

The pressures applied to the contact bars 20 are transmitted to the piezoelectric sensors 60. The locations of switches 12 (both those operated by being pressed, and those operated by being rotated) are determined by the pressures transmitted to the piezoelectric sensor units 60. In this state, the operation of each switch 12 is individually checked.

To check switches 12 that are operated by being pressed, the gear units 30 that are connected to the contact bars 20 with which the switches 12 are in contact are operated. The extension bars 21 and the contact bars 20 press the switches 12 while moving forward. In this manner, the operational performance and operational feeling of the switches 12 is tested white the switches 12 are pressed.

The contact pressures, generated when the switches 12 are pressed, are detected by the piezoelectric sensors 60. The detection of contact pressures enables the operational feeling of the corresponding switches 12 to be tested. The springs 50 absorb the force that is generated when the contact bars 20 come into contact with the switches 12.

Furthermore, when it is desired to check the operation of the switches 12 that are operated by being rotated, the motor units 40 are operated so that the contact bars 20 that contact the side surfaces of the switches 12 are rotated. That is, the topmost and bottommost contact bars 20 of FIG. 7, and the contact bars 20 shown in FIG. 8 are rotated.

Accordingly, as shown in FIG. 8, the switches 12 are rotated by the rotation of the contact bars 20 located on the sides of the switches 12. This enables the rotational operation performance and operational feeling of the switches 12 to be tested.

The detection values of the piezoelectric sensor units 60 are measured through the above-described process, and the measured values are transmitted to the control unit 70. In this case, the control unit 70 compares the measured values of the piezoelectric sensor units 60 with set values stored in the storage unit 80, and evaluates the operational performance and operational feeling of the switches 12 mounted to the audio system.

Furthermore, the values obtained through the evaluation of the control unit 70 are stored in the storage unit 80, which enables diagnosis of the switches 12.

As described above, the apparatus for testing the performance of a car audio system according to embodiments of the present invention can test audio systems having various types and locations of switches.

Although the present invention has been described in detail in conjunction with a specific embodiment with reference to the accompanying drawings, the present invention is not limited to that specific structure. A person having ordinary skill in the art may modify and change the disclosed embodiment of the present invention in various ways without departing from the technical spirit and scope of the present invention defined in the following claims. Any structures resulting from such simple modification or design changes to the disclosed embodiment are included in the scope of the claimed invention.

What is claimed is:

1. An apparatus for testing switches of a system, the system having a surface on which the switches are disposed, the apparatus comprising:
    a plurality of contact bars configured and dimensioned such that, in use, a front end of each contact bar contacts either one of the switches, or a portion of the surface of the system;
    a plurality of extension bars, each comprising a front end connected to a rear end of one of the contact bars;
    a plurality of gear units, each connected to a rear end of one of the extension bars, and configured to move the extension bar in forward and rearward directions;
    a plurality of motors, each mounted to one of the gear units and configured to rotate the extension bars;
    a plurality of piezoelectric sensors, each mounted to one of the motors to measure pressures applied to the contact bars; and
    a control unit, to compare the pressures with set values, and to diagnose the switches.

2. The apparatus as set forth in claim 1, wherein the contact bars each comprises a polygonal cross-section.

3. The apparatus as set forth in claim 2, wherein the polygonal cross-sections are hexagonal.

4. The apparatus as set forth in claim 1, wherein the contact bars are spaced apart from each other at substantially constant distances.

5. The apparatus as set forth in claim 1, further comprising a plurality of springs, each mounted between one of the motors and one of the piezoelectric sensors.

\* \* \* \* \*